US012540981B2

(12) United States Patent
Simonis et al.

(10) Patent No.: US 12,540,981 B2
(45) Date of Patent: Feb. 3, 2026

(54) METHOD AND APPARATUS FOR DIAGNOSING A CURRENT SENSOR IN AN ELECTRICALLY OPERATED TECHNICAL DEVICE HAVING A DEVICE BATTERY

(71) Applicant: Robert Bosch GmbH, Stuttgart (DE)

(72) Inventors: Christian Simonis, Leonberg (DE); Christoph Woll, Gerlingen (FR); Ioana Crisan, Cluj-Napoca (RO); Shi Li, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 18/415,815

(22) Filed: Jan. 18, 2024

(65) Prior Publication Data

US 2024/0248141 A1 Jul. 25, 2024

(30) Foreign Application Priority Data

Jan. 25, 2023 (DE) ..................... 10 2023 200 582.4

(51) Int. Cl.
*G01R 31/28* (2006.01)
*G01R 31/367* (2019.01)
*G01R 31/374* (2019.01)
*G01R 31/387* (2019.01)
*G01R 35/00* (2006.01)

(52) U.S. Cl.
CPC ....... *G01R 31/374* (2019.01); *G01R 31/2829* (2013.01); *G01R 31/367* (2019.01); *G01R 31/387* (2019.01); *G01R 35/00* (2013.01)

(58) Field of Classification Search
CPC .. G01R 31/374; G01R 31/387; G01R 31/367; G01R 31/2829; G01R 35/00

USPC ...................... 324/500, 600, 76.11, 415–430
See application file for complete search history.

(56) References Cited

U.S. PATENT DOCUMENTS

| 2014/0266228 A1* | 9/2014 | Baruzzi ............... G01R 31/389 |
| | | 324/430 |
| 2016/0023566 A1 | 1/2016 | Lee |
| 2016/0023567 A1 | 1/2016 | Lee |
| 2017/0353040 A1* | 12/2017 | Pickett ................. H02J 7/0019 |
| 2019/0190285 A1* | 6/2019 | Lee .......................... B60L 50/50 |
| 2020/0150185 A1 | 5/2020 | Ramezan Pour Safaei et al. |

(Continued)

FOREIGN PATENT DOCUMENTS

| DE | 102008043799 A1 | 5/2010 |
| DE | 102016113381 A1 | 2/2017 |

(Continued)

*Primary Examiner* — Huy Q Phan
*Assistant Examiner* — Truong Q Nguyen
(74) *Attorney, Agent, or Firm* — Michael Best & Friedrich LLP

(57) ABSTRACT

A method for determining a current sensor offset of a current sensor (47) in a device battery (41) of a technical device (4). In one example, the method includes measuring the battery current using the current sensor (47); providing (S1) a temporal profile of the battery current; recording (S2) a charge balance of the electrical charge amount flowing into the device battery (41) and out of the device battery (41) over time depending on the temporal profile of the battery current; creating (S2) or adjusting a charge balance model depending on a time-accumulated charge amount; and determining the current sensor offset depending on a local slope of the charge balance model at a specified time.

11 Claims, 4 Drawing Sheets

(56) References Cited

U.S. PATENT DOCUMENTS

| | | | |
|---|---|---|---|
| 2020/0379049 A1* | 12/2020 | Gray | G01R 31/367 |
| 2021/0293889 A1* | 9/2021 | Roumi | G01R 31/392 |
| 2022/0190614 A1* | 6/2022 | Jung | H02J 50/10 |
| 2022/0376623 A1* | 11/2022 | Singh | G05F 1/575 |
| 2023/0336008 A1* | 10/2023 | Pouyadou | H02J 7/0047 |

FOREIGN PATENT DOCUMENTS

| | | |
|---|---|---|
| DE | 102020212293 A1 | 3/2022 |
| JP | 2002238170 A | 8/2002 |
| JP | 2015200565 A | 11/2015 |

* cited by examiner

METHOD AND APPARATUS FOR DIAGNOSING A CURRENT SENSOR IN AN ELECTRICALLY OPERATED TECHNICAL DEVICE HAVING A DEVICE BATTERY

BACKGROUND

The invention relates to device batteries for operating technical devices, and in particular to methods for diagnosing a current sensor for monitoring a battery current.

The operation of battery operated technical devices requires continuous and precise monitoring of a battery current of a corresponding device battery. The required accuracy of the measurement of the battery current follows from the use of battery models that include a differential equation system and derive the battery states based on a time integration method depending on a profile of the battery current.

In practice, current measurement using a current sensor is subject to an offset error, which in time integration based methods of a battery model can lead to erroneous modeling of current battery states.

SUMMARY

Provided according to the invention are a method for determining a current sensor offset of a current sensor in a battery operated technical device having a device battery, as well as a corresponding apparatus according to the independent claim.

Further embodiments are specified in the dependent claims.

According to a first aspect, a method of determining a current sensor offset of a current sensor in a device battery of a technical device is provided, with the following steps:
  measuring the battery current using the current sensor;
  providing a temporal profile of the battery current;
  recording a charge balance of the electrical charge amount flowing into the device battery and out of the device battery over time depending on the temporal profile of the battery current;
  creating or adjusting a charge balance model depending on a time-accumulated charge amount;
  determining the current sensor offset depending on a local slope of the charge balance model at a specified time.

In order to determine current battery states, operating values such as the battery current are continuously detected and evaluated using one or more battery models. In order to evaluate the operating value data, in particular to determine ageing conditions, an electrochemical battery model can be used, for example, which is based on a differential equation system with a plurality of non-linear differential equations. The operating value data enable a modeling of a current battery state using a time integration method. Such electrochemical battery models are known, for example, from the publications US 2016/023,566, US 2016/023,567 and US 2020/150,185.

The battery current is measured using a current sensor. Current sensors typically have an age-related drift that, acting as an offset, affects the measured current value. In order to improve the accuracy of the current measurement using a current sensor, a current sensor offset is often determined, which is applied to the measured current value to provide a corrected battery current. The determination of a current offset as a correction value is determined by balancing the battery currents flowing into the device battery and out of the device battery.

Due to the accumulation of the electrical charge flowing into and out of the device battery, the average temporal profile of the balance of the electrical charge deviates from 0 as a result of a current sensor error. The slope of this profile substantially indicates a current sensor offset error, which may be provided as a correction value to the affected current sensor.

A remaining service life of the current sensor can be determined and signaled, wherein the remaining service life of the current sensor is determined by extrapolation of the charge balance model over time.

The charge balance model can be trained as a data-based model or fitted as a parametric model.

In addition, a modeling of the current sensor offset in a charge balance model allows for a reduction in the profile of the current sensor offset and a determination of a remaining service life defined by reaching a maximum allowable current sensor offset. The charge balance model can be data-based, such as a Bayesian neural network or a Gaussian process function, or parametrically modeled, such as using a polynomial or spline function, or modeled as a hybrid function by first modeling a linear portion with a linear regression model and modeling a remaining residue using a data-based correction function.

The remaining service life, defined by the time at which a predetermined maximum allowable current sensor offset is reached, can be signaled in an appropriate manner and/or used to schedule maintenance or replacement of the current sensor.

According to one embodiment, the method can be performed in a central processing unit remote from the device, to which the temporal profile of the battery current is transmitted.

By transmitting the profiles of the battery currents to a central processing unit external to the device, the current flows can be balanced and the charge balance model can be trained or fitted in a corresponding manner. If the charge balance model is available in the central processing unit, the current sensor offset can also be derived therefrom and the battery currents transmitted by the technical device can be corrected accordingly to use downstream battery models to calculate a battery state or aging state based on a differential equation system evaluated using a time integration method.

It can be provided that the current sensor offset is determined in the central processing unit and transmitted to the technical device to perform device functions based on an evaluation of the battery current, depending on the current sensor offset.

It can be provided that the charge balance model of a plurality of device batteries is evaluated to determine a dependence of the current sensor offset on a stress factor, wherein upon detection of a dependence on a stress factor, the technical device is operated accordingly to reduce the stress factor.

In the central processing unit external to the device, the development of the current sensor offset over time can also be analyzed with regard to further usage characteristics of the device battery, for example, a dependence of the current sensor offset after a predetermined service life can be determined depending on stress factors, such as mechanical stress or temperature stress. Detected stress factors, i.e., dependence of the development of the current sensor offset on the corresponding stress factor, can be correspondingly signaled to a user of the device, such that the user can take appropriate measures to reduce the corresponding stress factor in order to increase the service life of the current sensor. Such measures can be activated by the user or can also be activated automatically to slow the degradation of the current sensor.

BRIEF DESCRIPTION OF THE DRAWINGS

Embodiments are explained in more detail in the following with reference to the accompanying drawings. Shown are.

DETAILED DESCRIPTION

In the following, the method according to the invention is described with reference to vehicle batteries as device batteries in a multitude of motor vehicles as similar devices. For this purpose, one or more aging state models are operated in the central processing unit and used for the calculation of aging and, if necessary, aging prediction. In the central processing unit, the aging state models are continuously updated or re-trained based on operating values of the vehicle batteries from the vehicle fleet.

The example above is representative of a plurality of stationary or mobile devices with a network-independent energy supply, such as vehicles (electric vehicles, pedelecs, etc.), systems, machine tools, household appliances, IOT devices, and the like, which are connected via a corresponding communication connection (e.g., LAN, Internet) to a central processing unit external to the device (Cloud).

Figure 1:
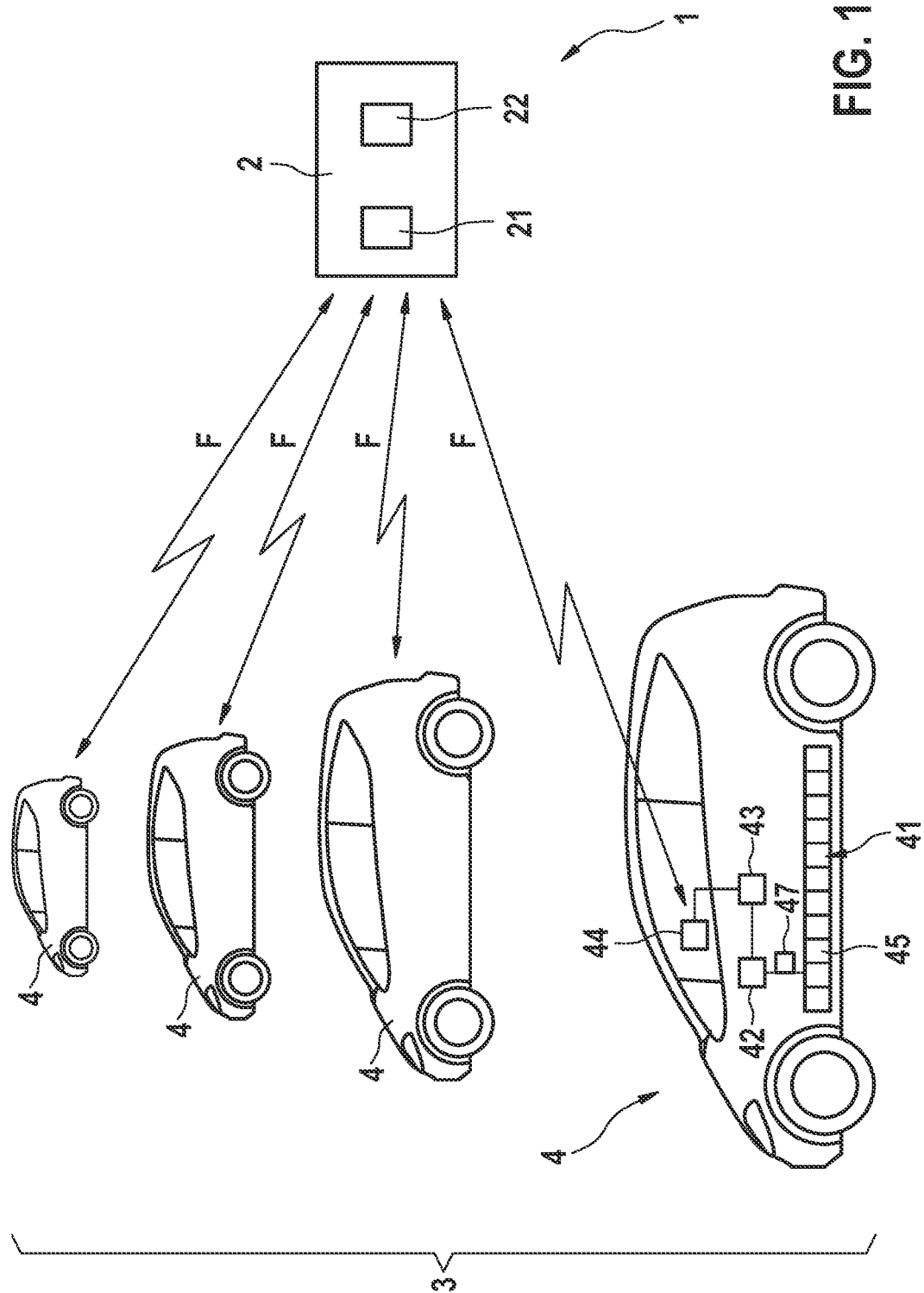
FIG. 1 a schematic illustration of a battery system in a vehicle as a technical device.

FIG. 1 shows a system 1 for collecting fleet data in a central processing unit 2 for operating and evaluating an electrochemical battery model and/or a battery performance model and/or an aging state model. The aging state model is used to determine an aging state of battery cells of the vehicle battery in a motor vehicle. FIG. 1 shows a vehicle fleet 3 with a several motor vehicles 4. The electromechanical battery model serves to model internal states of the battery cells of the vehicle battery 41.

One of the motor vehicles 4 is shown in greater detail in FIG. 1. The motor vehicles 4 each comprise a vehicle battery 41, an electric drive motor 42, and a control unit 43. The control unit 43 is connected to a communication system 44, which is suitable for transmitting data between the respective motor vehicle 4 and a central processing unit 2 (a so-called cloud).

The vehicle battery 41 includes a plurality of battery cells 45 that are to be monitored for loading and aging states according to methods described below.

The vehicle battery 41 is connected to a current sensor 47 that detects the battery currents flowing into the vehicle battery 41 and the battery currents flowing out of the battery and transmits these to a battery management system.

Such current sensors 47 typically have an offset, such that the battery current value communicated to the battery management system typically deviates slightly from the actual battery current value. The deviation corresponds to a current sensor offset and is constant for a short time. The current sensor offset acts independently of the direction of current of the battery current and is equal for battery currents in or out of the vehicle battery 41, such that a charging current is increased and a discharging current is decreased or vice versa.

The controller 43 is particularly configured to provide data for selected, selectable, or all battery cells 45 having a high temporal resolution, such as between 1 and 50 Hz, such as e.g., 10 Hz, and transmits such to the central processing unit 2 via the communication device 44.

The motor vehicles 4 send the operating values F to the central processing unit 2, which indicate at least values that affect the aging state of the vehicle battery 41, and which are required for a determination of the internal states of the battery cells 45. The operational variables F can indicate an instantaneous battery current, an instantaneous battery voltage, an instantaneous battery temperature, and an instantaneous state of charge (SOC) at the pack, module, and/or cell level. The operating variables F are acquired in a fast chronological grid from 0.1 Hz to 50 Hz as temporal operating variable curves, and can be transmitted regularly to the central processing unit 2 in uncompressed and/or compressed form.

The central processing unit 2 comprises a data processing unit 21, in which the method described below can be performed, and a database 22 for storing data points, model parameters, states, and the like.

One or more battery models are implemented in the central processing unit 2. For example, an aging state model can be provided that is partially data-based as a hybrid model. The aging state model may be used regularly, i.e., for example, after the respective evaluation period has elapsed, in order to determine the instantaneous aging states of the relevant vehicle battery 41 of the vehicle fleet 3 based on the time profiles of the operating variables (in each case since the initial operation of the respective vehicle battery) and operating features determined therefrom. In other words, it is possible to determine aging states of the relevant vehicle battery 41 based on the profiles of the operating values of one of the vehicle batteries 41 of the motor vehicles 4 of the associated vehicle fleet 3 and the operating features resulting from these profiles of the operating values.

The central processing unit 2 can be designed to receive the operating value profiles and to model a digital twin for each vehicle 4 or vehicle battery 41. For each battery cell 45 of vehicle battery 41, the digital twin determines a current battery state and/or aging state using an electrochemical battery model or the hybrid aging state model and continues to update it based on the operating value profiles of the operating values. In particular, for each battery cell 45 of vehicle battery 41, the digital twin can provide a battery performance model that models, using its model parameters, an internal state of the battery cell that can be updated by time intervals of the operating value profiles.

Figure 2:
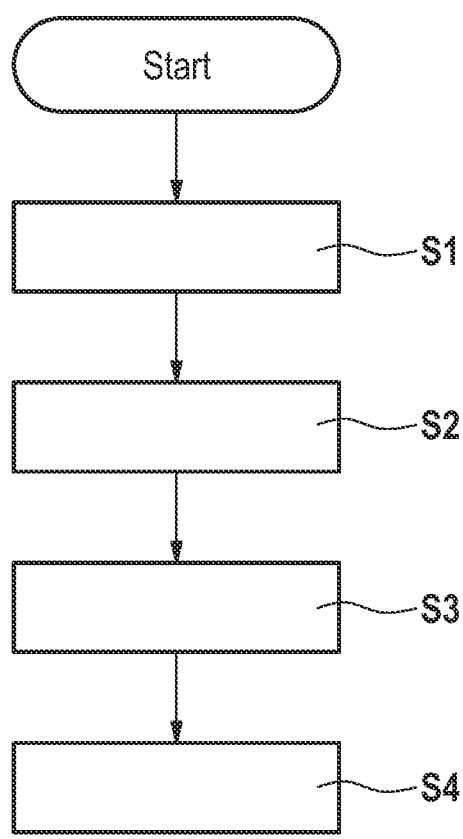
FIG. 2 a flowchart illustrating a method for diagnosing a current sensor.

FIG. 2 shows a flow chart for diagnosing the current sensor to measure the battery current. The method can be performed in the battery management system or in the central processing unit 2 remote from the vehicle.

In step S1, operating value profiles with a high temporal resolution of, for example 10 Hz are first recorded and provided in the central processing unit 2. The operating values correspond to the battery current, the battery temperature, the battery voltage and, if necessary, the state of charge. Data processing can be performed including outlier detection, filtering, and data cleanup, interpolation, or the like.

Figure 3:
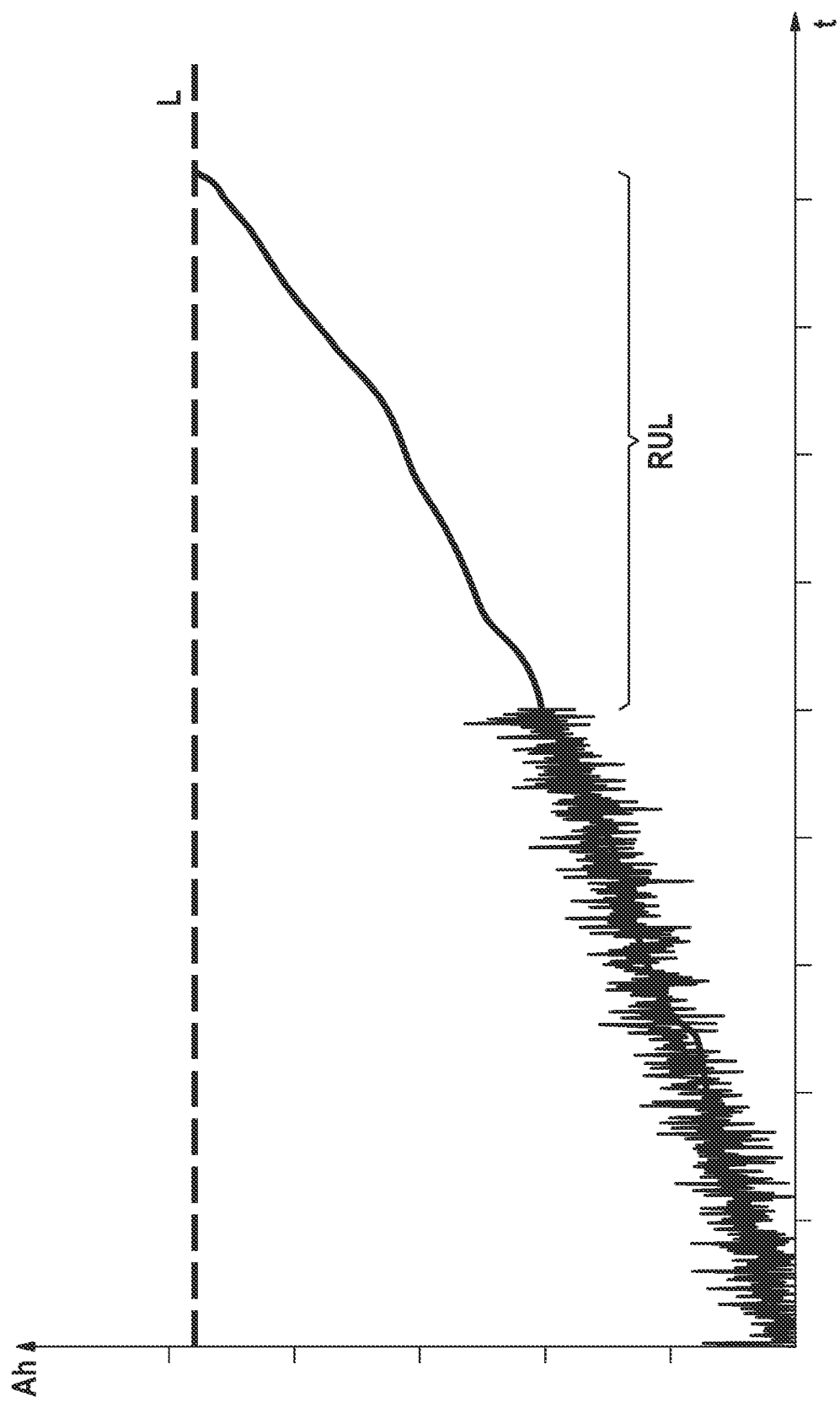
FIG. 3 a profile of the accumulated throughput of electrical energy and the profile of the charge balance model.

In step S2, the received battery current values are continuously integrated temporally as part of the provided operating value profiles in order to balance the accumulated charge, i.e., for example the electrical charge supplied to the battery is evaluated positively and the electrical charge removed from the battery is evaluated negatively. The result is a profile of the accumulated electrical charge balance, as shown in FIG. 3. The unit of charge is indicated with Ah. The fluctuations correspond to the charging and discharging cycles. It can be seen that on average the accumulated charge balance increases, which is a result of a systematic current sensor offset. On average, the slope of the charge balance profile determined in this way at a specific time indicates the current sensor offset at that specific time.

As the charge balance varies widely due to the discharge and charge cycles, it is now provided to describe the average profile of the charge balance using a charge balance model. The charge balance model can be configured to be data-based, parametric, or hybrid. For example, the charge balance function can be configured using a data-based model, i.e., in particular, a Gaussian process model. Alternatively, the charge balance function can also be configured parametrically, e.g., as a polynomial or spline function. Furthermore, the charge balance model can be represented by linear regression of the charge balance profile over time with a linear regression model and the residue can be modeled using a correction function based on data, e.g., using a Gaussian process. This results in a charge balance model which describes a smoothed profile of the charge balance. This allows an indication of the current sensor offset as the time derivation of the charge balance model and simultaneously a prediction of the profile of the accumulated charge balance over time.

In step S3, a remaining service life RUL of the current sensor 47 is determined by updating the development of the charge balance resulting from the sensor offset of the current sensor, with a maximum allowable accumulated smoothed charge balance L being specified. To this end, the modeled accumulated charge balance is extrapolated over time based on the charge balance model.

This remaining service life can be signaled in step S4 to indicate if and when the current sensor needs to be replaced or recalibrated.

By performing the method in the central processing unit 2 remote from the device, further battery models can benefit, which carry out evaluations of the battery state based on operating value profiles including the battery current. For example, an aging state model can be implemented in the central processing unit 2 remote from the device, which uses an electrochemical battery model corresponding to a differential equation system that further develops battery states based on a time integration method.

The accuracy of the operating value profiles provided is essential for the reliability of such a method. Thus, it can be provided in the central processing unit remote from the device that the measured value of the battery current received from the vehicle 4 is corrected using the current sensor offset determined by the gradient of the charge balance model.

Furthermore, upon execution of the method in the central processing unit 2, the determined current sensor offset value can be transmitted back to the relevant vehicle to perform in-vehicle functions based on a correct value of the battery current.

Figure 4A:
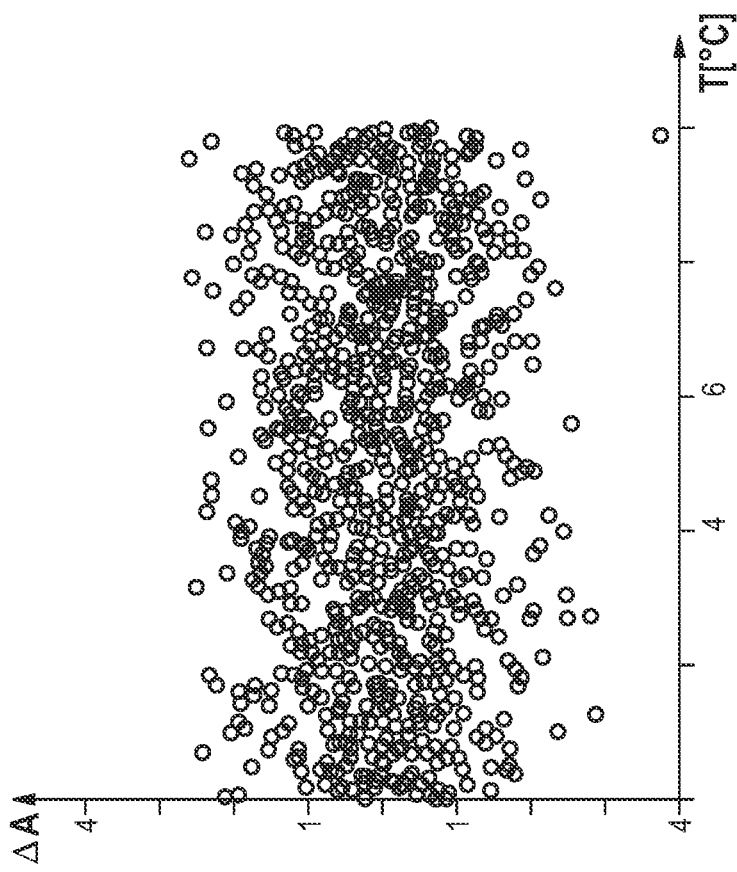
FIGS. 4a and 4b diagrams illustrating a stress factor analysis.
Figure 4B:
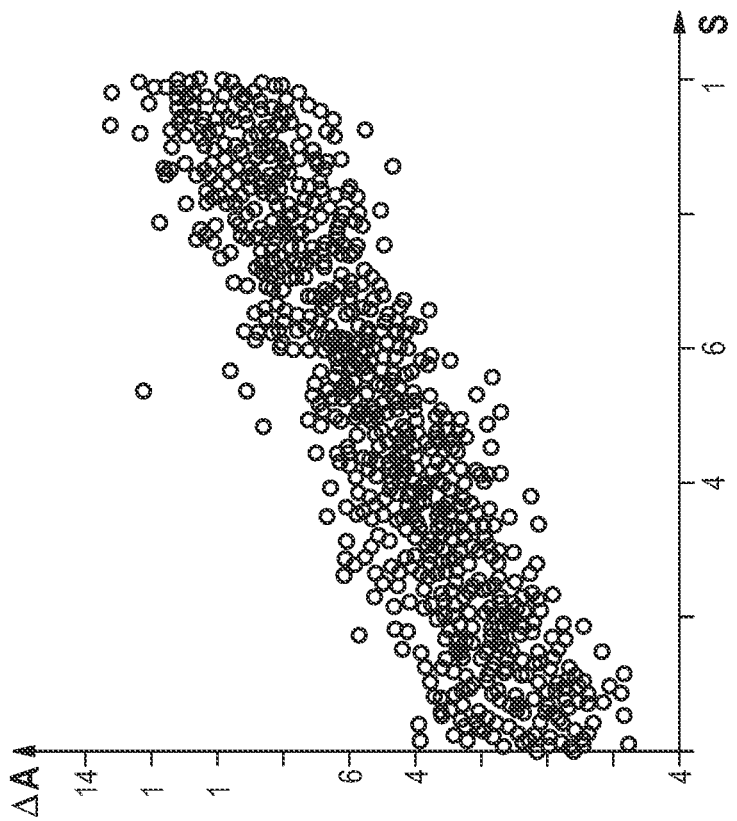

A stress factor analysis may further be performed in the central processing unit 2 by correlating a corresponding stress factor for a plurality of vehicle batteries 41 that perform a corresponding evaluation of the charge balance in the central processing unit 2. For example, the current sensor offset values of various vehicle batteries 41 may be plotted after a predetermined service life, for example 5 years, over a value of a stress factor, for example an indication of an average mechanical stress load S (see FIG. 4a). The load S can correspond to an average vibration energy, an average vibration amplitude, or the like. After applying a linear regression, a slope of the resulting curve is obtained, which indicates a dependence of the current sensor drift after 5 years on the stress factor "mechanical stress".

As an alternative example, the current sensor drift is plotted over an average battery temperature after a service life of 5 years. It can be seen that the current sensor drift does not depend on the battery temperature, because the curve resulting from a linear regression is substantially horizontal.

If a stress factor relevant to the aging of the current sensor 47 has been identified, the vehicle may be operated accordingly to reduce the aging of the current sensor 47. For example, driving on less uneven roadways can be proposed as a stress factor in the event of a dependence of the mechanical stress load, particularly if a remaining service life of the current sensor indicates that a predetermined minimum service life will not be achieved.

The invention claimed is:

1. A method for determining a current sensor offset of a current sensor (47) in a device battery (41) of a technical device (4), the method comprising:
   measuring a battery current using the current sensor (47);
   providing (S1) a temporal profile of the battery current to a central processing unit (2) via a communication system (44) of the technical device (4);
   recording (S2) a charge balance of an electrical charge amount flowing into the device battery (41) and out of the device battery (41) over time depending on the temporal profile of the battery current;
   creating (S2) or adjusting a charge balance model depending on a time-accumulated charge amount; and
   determining the current sensor offset depending on a slope of the charge balance model at a time,
   wherein the current sensor offset is transmitted to the communication system (44) of the technical device (4) to perform, via a control unit (43), device functions to automatically reduce a mechanical stress experienced by the device battery (41) based on an evaluation of the battery current depending on the current sensor offset.

2. The method according to claim 1, wherein the central processing unit (2) is remote from the technical device (4).

3. The method according to claim 1, wherein a remaining service life of the current sensor is determined (S3) by the central processing unit (2) and an indication is provided by the central processing unit (2) (S4), wherein a remaining service life (RUL) of the current sensor (47) is determined by extrapolation of the charge balance model over time, wherein the remaining service life (RUL) results as a time period until a predetermined maximum accumulated charge balance is reached, wherein the indication is provided by the central processing unit (2) when the remaining service life falls below a predetermined threshold value.

4. The method of claim 3, wherein the indication is provided to a user of the technical device (4) and indicates that the current sensor (47) requires maintenance, recalibration, and/or replacement.

5. The method according to claim 1, wherein a remaining service life (RUL) of the current sensor (47) is determined and signaled, wherein the remaining service life in a data-based charge balance model is determined via a point estimator of a prediction, which describes a defined quantile of a probabilistic prediction.

6. The method according to claim 1, wherein the charge balance model is trained as a data-based model or fitted as a parametric model.

7. The method according to claim 1, wherein signaling occurs when the current sensor offset exceeds a predetermined threshold value.

8. The method according to claim 1, wherein the charge balance model is trained as a data-based model or fitted as a parametric model.

9. The method according to claim 1, wherein the charge balance model of a plurality of device batteries is evaluated to determine a dependence of the current sensor offset on a stress factor, wherein upon detection of a dependence on a stress factor, the technical device (4) is operated accordingly to reduce the stress factor, wherein operating accordingly includes automatically controlling the technical device (4) to reduce driving on uneven roadways.

10. A device determining a current sensor offset of a current sensor (47) in a device battery (41) of a technical device (4), the device determining the current sensor offset configured to:
   measure a battery current using the current sensor (47);
   provide (S1) a temporal profile of the battery current to a central processing unit (2) via a communication system (44) of the technical device (4);
   record (S2) a charge balance of an electrical charge amount flowing into the device battery (41) and out of the device battery (41) over time depending on the temporal profile of the battery current;
   create (S2) or adjust a charge balance model depending on a time-accumulated charge amount; and
   determine the current sensor offset depending on a local of the charge balance model at a time,
   wherein the current sensor offset is transmitted to the communication system (44) of the technical device (4) to perform, via a control unit (43), device functions to automatically reduce a mechanical stress experienced by the device battery (41) based on an evaluation of the battery current depending on the current sensor offset.

11. A non-transitory, computer-readable storage medium comprising instructions that, when executed by a computer, cause the computer to determine a current sensor offset of a current sensor (47) in a device battery (41) of a technical device (4), by:
   measuring a battery current using the current sensor (47);
   providing (S1) a temporal profile of the battery current to a central processing unit (2) via a communication system (44) of the technical device (4);
   recording (S2) a charge balance of an electrical charge amount flowing into the device battery (41) and out of the device battery (41) over time depending on the temporal profile of the battery current;
   creating (S2) or adjusting a charge balance model depending on a time-accumulated charge amount; and
   determining the current sensor offset depending on a slope of the charge balance model at a time,
   wherein the current sensor offset is transmitted to the communication system (44) of the technical device (4) to perform, via a control unit (43), device functions to automatically reduce a mechanical stress experienced by the device battery (41) based on an evaluation of the battery current depending on the current sensor offset.

* * * * *